United States Patent [19]

Hing et al.

[11] 4,330,629
[45] May 18, 1982

[54] HEAT-RESISTANT SEALING MATERIALS

[75] Inventors: Peter Hing; Ehsan U. Khan, both of London, England

[73] Assignee: Thorn EMI Limited, London, England

[21] Appl. No.: 46,550

[22] PCT Filed: Oct. 18, 1978

[86] PCT No.: PCT/GB78/00026
§ 371 Date: Jun. 7, 1979
§ 102(e) Date: Jun. 7, 1979

[87] PCT Pub. No.: WO79/00220
PCT Pub. Date: May 3, 1979

[51] Int. Cl.³ ............................ C03C 3/12; C03C 3/14
[52] U.S. Cl. .................................. 501/47; 501/48; 501/50
[58] Field of Search ............... 106/73.2, 47 R, 47 Q, 106/48; 313/221; 501/47, 48, 50

[56] References Cited

U.S. PATENT DOCUMENTS

| | | | |
|---|---|---|---|
| 3,588,573 | 6/1971 | Chen | 106/73.2 |
| 3,615,762 | 10/1971 | Parry | 106/47 Q |
| 3,682,766 | 8/1972 | Maher | 106/73.2 |
| 4,122,042 | 10/1978 | Meden-Piesslinger | 106/73.2 |

FOREIGN PATENT DOCUMENTS

| | | | |
|---|---|---|---|
| 1710 | 5/1979 | European Pat. Off. | 106/73.2 |
| 2307191 | 8/1973 | Fed. Rep. of Germany . | |
| 1351331 | 6/1964 | France . | |

Primary Examiner—Mark Bell
Attorney, Agent, or Firm—Robert F. O'Connell

[57] ABSTRACT

Sealing materials for making heat-resistant seals in electrical discharge devices comprise a rare earth oxide, such as lanthanum oxide, and boric oxide, preferably together with minor amounts of phosphorus pentoxide, aluminium oxide and magnesium oxide. Preferred compositions comprise 55 to 95% lanthanum or other oxide, 5 to 45% boric oxide and 0 to 5% phosphorus pentoxide, 0 to 5% aluminium oxide and 0 to 5% magnesium oxide. The compositions can be made by mixing the oxides, or appropriate salts, calcining the mixture at up to 1200° C. and crushing it to a powder. They may be used as frits in a slurry or formed into pressed elements such as discs or washers. Sealing can be accomplished by heating the surfaces to be joined, together with the interposed sealing composition, to a temperature between 1100° and 1650° C.

7 Claims, 3 Drawing Figures

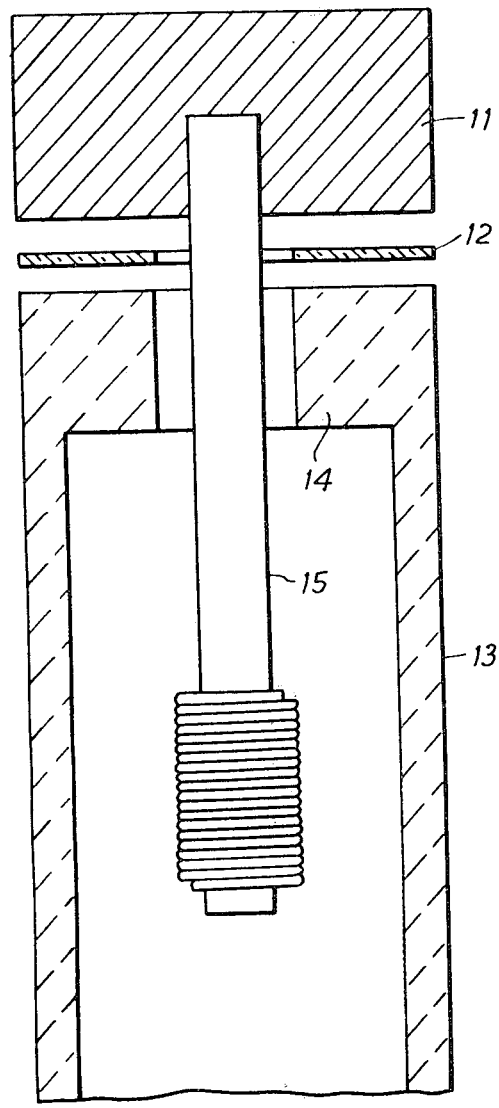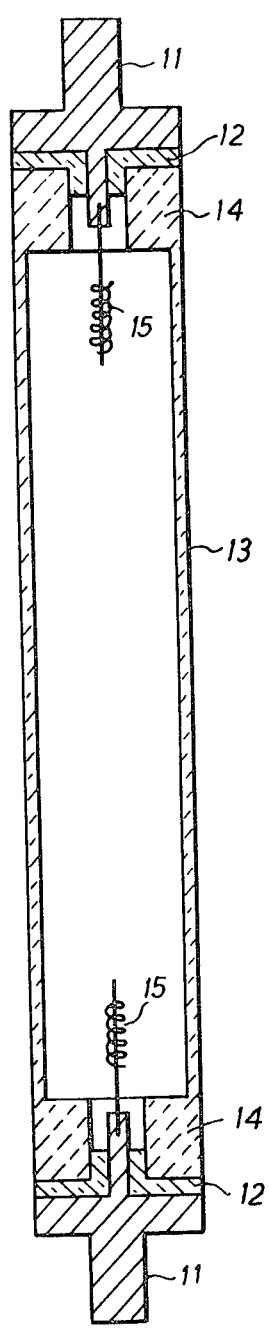

HEAT-RESISTANT SEALING MATERIALS

The present invention relates to sealing materials suitable for making heat-resistant, and usually hermetic, seals between components of electrical discharge devices.

It has been known for a number of years, as revealed in U.S. Pat. No. 3,588,573 and German Pat. No. 2,307,191, that the current sealing material for high pressure sodium lamps based on a modified calcium magnesium aluminate composition with barium oxide and a small amount of boric oxide is chemically inadequate in the presence of reactive metal halide vapours at around 800° C. In U.S. Pat. No. 3,588,573 a family of high temperature metal halide resistant sealing compounds using alumina and rare-earth oxides with high melting points ranging from 1720° C. to 1800° C. is disclosed. The use of such high temperatures for sealing the end of the arc tubes, particularly in the case of short tubes, presents considerable technical problems. For instance, it can easily cause volatilisation of the metal halide species in the final lamp processing.

German Pat. No. 2,307,191 discloses the use of some sealing compounds in the $Al_2O_3$-$SiO_2$-MnO system, which are claimed to be metal halide resistant. The silica in the sealing compound is likely to interact with certain metal halides, such as scandium iodide, commonly used in conventional metal halide lamps with a silica envelope. The reaction between scandium iodide and silica is a well-known factor limiting the colour rendition and efficiency of these lamps. The disclosure by Matshusita in Japanese Patent Application No. 47-34066 of an unspecified metal halide resistant sealing material of the $Al_2O_3$-$SiO_2$-$B_2O_3$-BeO type is also suspect because of the presence of silica. It is also likely to be objectionable in the lighting industry because of the presence of beryllia, which is a highly toxic material.

We have now found in accordance with this invention that compositions comprising a rare earth oxide and boric oxide, preferably together with minor amounts of phosphorus pentoxide, aluminum oxide and magnesium oxide are useful as sealing compositions in the construction of seals in ceramic discharge lamps, more especially between sintered ceramic oxides such as alumina, the cermet materials such as those disclosed in our co-pending Application DE-OS No. 26 55 726, for example alumina-tungsten and alumina-molybdenum cermets. Seals made with these compositions are, moreover, found to retain their hermetic properties and integrity without any sign of chemical attack after 100 hours at 900° C. in reactive metal halide vapours such as mercuric chloride, mercury iodide, sodium chloride, tin chloride, scandium iodide, sodium iodide or cesium iodide.

Although the preferred rare earth oxide is lanthanum oxide, other rare earth oxides, such as Sm, Nd, Sc, Y, Yb, Dy or Ce oxides, or mixed rare earth oxides, can also be used.

Suitable sealing compositions comprise, by weight, 55 to 95% rare earth oxide, 5 to 45% boric acid, up to 5% phosphorous pentoxide, and up to 5% aluminum oxide and/or magnesium oxide.

The most successful compositions lie in the range of proportions by weight: 60 to 95% rare earth oxide, 5 to 50% boric oxide, 0 to 5% phosphorus pentoxide, 0 to 5% aluminum oxide and 0 to 5% magnesium oxide.

Also in accordance with this invention it has further been found that hermetic seals between dense alumina components, cermet components or alumina and cermet components can be prepared by using the composition defined above in vacuum or inert atmospheres between 1100° C. and 1650° C.

In particular, compositions around the eutectic compositions of the rare earth and boric oxides, for example 89.68% by weight lanthanum oxide and 10.32% by weight of boric oxide, have been found to seal translucent alumina are tubes to alumina-tungsten cermets at 1350° C. The sealing material at the join between the sintered alumina and cermet components consists mainly of two major crystalline phases: in the case of lanthanum oxide $3La_2O_3.B_2O_3$ and $La_2O_3.B_2O_3$. These crystalline phases precipitated from the melt during cooling are quite coarse, typically several hundred microns in diameter.

The assembly of large crystalline phases, although not obviously detrimental to the construction of hermetic seals, lowers the strength of the seal and is liable to initiate cracks during thermal cycling. We have found that the addition of a small amount of phosphorus pentoxide, aluminium oxide and magnesium oxide, through the formation of aluminium phosphate and magnesium phosphate, reduces the size of the precipitated phases by at least an order of magnitude, typically to the order of 3 to 5 microns in diameter. The morphology of the precipitated phases is also drastically altered from large octahedral crystalline phases to needle-like platelets. Although the exact mechanisms responsible for the microstructural changes are not well understood, the included additive such as phosphorus pentoxide, aluminium oxide and magnesium oxide, preferably up to a total of about 3% by weight drastically increase the rate of crystal nucleation during solidification and subsequently increase the number of crystalline phase per unit volume. Thus a preferred composition is about 88.50% by weight lanthanum oxide, 10.50% by weight boric oxide, 0.5% by weight aluminium oxide, 0.5% by weight magnesium oxide and 0.5% by weight phosphorus pentoxide.

A preferred method of preparing the sealing compound of this invention consists of mixing the appropriate amount of rare earth oxide, obtained through a soluble salt such as the nitrate, sulphate or oxalate, with boric oxide. The additives can also be added as oxides or through a soluble salt or their respective phosphates. The mixture is then fused at 200° C. for 2 hours to homogenize the materials, calcined at up to 1200° C. for 7 hours, in air or inert atmosphere, crushed and sieved through a 250 micron aperture mesh. The fusion temperature and fusing time are not particularly critical as this technique simply helps to homogenize all the constituents. However, a preferred calcining temperature in air or inert atmosphere is 900° C. for the production of fine mixed oxide powders with good flow, pressing and ejection characteristics, thus permitting the formation of elements such as discs, thin rings or washers. The fusion and calcination must be carried out in high purity alumina or platinum crucibles to avoid picking up undesirable impurities which could adversely affect the sealing behaviour.

The frit can be applied in the form of a slurry, using an organic liquid such as methyl or ethyl alcohol; the frit slurry or a preformed ring or disc can then be prefired or premelted on the ceramic or cermet component prior to the final sealing operation. Premelted frit on the ceramic components offers additional advantages as it removes trapped air, moisture and other residual volatile species which could interfere with the final ceramic lamp processing.

The lanthanum oxide compositions set forth in the Table possess excellent wettability. They represent preferred percentage ranges of the individual constituents, but not the limits of useful compositions.

TABLE 1

| $La_2O_3$ % by wt | $B_2O_3$ % by wt | $P_2O_5$ % by wt | $Al_2O_3$ % by wt | MgO % by wt |
| --- | --- | --- | --- | --- |
| 80 | 15 | 1.5 | 1.5 | 2 |
| 85 | 12 | 1.0 | 1.0 | 1.0 |
| 87 | 10 | 1.0 | 1.0 | 1.0 |
| 89 | 9.5 | 0.5 | 0.5 | 0.5 |
| 93 | 6.0 | 0.4 | 0.4 | 0.2 |

Sealing the components between 1325° C. and 1500° C. with a tantalum heating element or by radio frequency heating permits the formation of a good fillet between the alumina components and the cermet components or between the alumina to cermet components without producing unnecessary flow of the sealing materials, for instance, along the length of the alumina arc tube. The alumina arc tube may be a sintered alumina or artificial sapphire tube.

The heating rate should preferably not exceed 700° C. per minute to avoid entrapment of air in the melted sealing materials. A suitable heating rate is 400° C. per minute as this minimises the formation of air bubbles. Holding the temperature for 2 minutes, moreover, helps the sealing materials to wet the alumina arc tube and the cermet components. The sealing materials are suitable for joining components irrespective of whether the surfaces are machined, polished or in the as-sintered condition.

Another important factor in the construction of a hermetic seal between alumina and cermet materials is the rate of cooling of the melt, a preferred cooling rate being 40° C. per minute for 5 minutes after melting and holding the melt for 2 minute, followed by a cooling rate not exceeding 80° C. per minute for another 15 minutes. The cooling rate allows the additives to act synergetically in the production of small interlocking crystalline phases, which confers improved strength on the seal, thus enabling it to withstand thermal cycling as is necessary for lamp operation.

It has further been found that by increasing the amount of boric oxide in the $La_2O_3.B_2O_3$ system beyond near eutectic proportions, hermetic seals can be effected at temperatures as low as 1100° C. The upper limit of sealing temperatures is as high as 1600° C. Table II below shows the compositions and the minimum temperatures at which hermetic seals have been obtained between alumina envelopes and cermet caps.

TABLE II

| $La_2O_3$ % by weight | $B_2O_3$ % by weight | Minimum temperature for hermetic seals |
| --- | --- | --- |
| 75.65 | 24.35 | 1100° C. |
| 78.38 | 21.66 | 1150° C. |
| 80.28 | 19.62 | 1175° C. |
| 82.31 | 17.69 | 1200° C. |
| 84.44 | 15.56 | 1275° C. |

Apart from the addition of small amounts of phosphorus pentoxide, alumina and magnesia, other rare-earth oxides, for example those of yttrium, ytterbium samarium, dysprosium and cerium, can be additionally incorporated in the $La_2O_3.B_2O_3$ system to enhance the properties of the seals. The total amount of these minor oxides should preferably not exceed 5% by weight. It is desirable, but not essential, to include these minor additions to effect hermetic seals. Examples of compositions with such additions which have been successfully used for obtaining hermetic seals are shown in the following Table III.

TABLE III

| $La_2O_3$ % by weight | $B_2O_3$ % by weight | $Dy_2O_3$ % by weight | $Ce_2O_3$ % by weight | MgO % by weight | $Al_2O_3$ % by weight | $P_2O_5$ % by weight |
| --- | --- | --- | --- | --- | --- | --- |
| 70.25 | 24.75 | 1.50 | 1.5 | 1.5 | 0.50 | 0.50 |
| 77.02 | 19.50 | 2.00 | — | — | 0.52 | 0.50 |
| 79.14 | 17.15 | 1.00 | 1.00 | 1.00 | — | 0.75 |
| 81.40 | 15.60 | — | — | — | 1.00 | 1.00 |

The most successful compositions of this kind fall in the range of proportions by weight: 60 to 95% lanthanum oxide, 5 to 40% boric oxide, 0 to 5% phosphorus pentoxide, 0 to 5% aluminum oxide, 0 to 5% magnesium oxide, 0 to 5% other rare earth oxide, such as dysprosium oxide, cerium oxide, ytterbium oxide or samarium oxide.

As already mentioned, sealing compositions can be based on rare earth oxides other than lanthanum oxide, such as samarium oxide and neodymium oxide. These sealing compounds in, for example, the $Sm_2O_3.B_2O_3$ systems are similar to those in the $La_2O_3.B_2O_3$ system. Table IV below shows some useful sealing compositions of this kind.

TABLE IV

| $Nd_2O_3$ | $Sm_2O_3$ | $B_2O_3$ | Range of sealing temperature °C. |
| --- | --- | --- | --- |
| 79.32 | — | 23.68 | 1450–1600 |
| 72.35 | — | 27.75 | 1350–1600 |
| 67.45 | — | 32.55 | 1200–1600 |
| 61.34 | — | 38.66 | 1200–1600 |
| — | 70.96 | 29.04 | 1450–1600 |
| — | 72.95 | 27.05 | 1350–1600 |
| — | 68.23 | 31.77 | 1200–1600 |
| — | 64.37 | 35.63 | 1200–1600 |

Seals described herein as hermetic will usually be impervious to helium. Such seals are achieved by the preferred compositions and methods here described but it will be appreciated that such a degree of hermeticity may not always be required.

In the accompanying drawings:

FIG. 2 shows one example of a lamp seal constructed with the help of the materials of this invention; and FIG. 3 shows a further example of a constructed seal.

Figure 1:
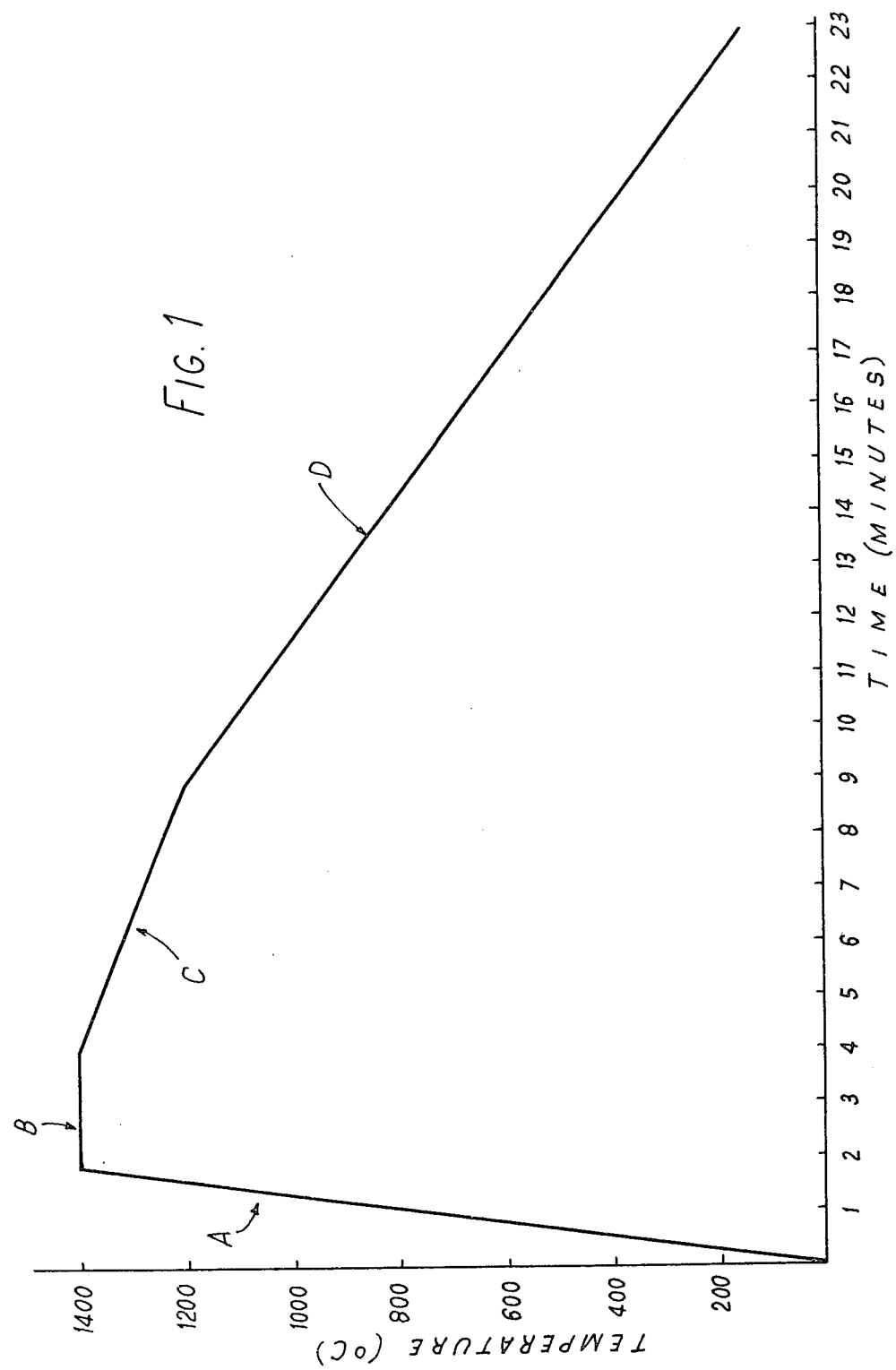
FIG. 1 is a diagram illustrating a typical sealing sequence.

In FIG. 1, in which temperature is plotted against tme, one example is given of a heating and cooling sequence suitable for sealing an alumina component to a cermet component. After initial heating to 1400° C. in the region A, the seal is held at this temperature (region B) and subsequently allowed to cool slowly. The first stage of cooling C is more gradual than the second stage D.

Constructed seals are shown by way of example only in FIGS. 2 and 3. These seals have withstood metal halide vapours such as mercuric chloride, mercuric iodide, sodium chloride, tin chloride, scandium iodide, sodium iodide or cesium iodide at 900° C. for at least 100 hours without any visible sign for chemical reaction. The seals remain hermetic after exposure to these active metal halides used in a variety of metal halide lamps. In the lamp of FIG. 2, a cermet cap 11 carrying the electrode 15 is placed on a frit ring 12 composed of the sealing materials of this invention at the end of an alumina arc tube 13 with a monolithic alumina plug 14. FIG. 3 shows a completely sealed unit ready for incorporation into a ceramic discharge lamp. The reference numerals have the same significance as in FIG. 2.

The sealing materials of this invention can be used in a variety of ways for the construction of ceramic discharge lamps containing sodium and/or metal halide vapours in alumina arc tubes. For instance, they can be used for sealing hermetically alumina and niobium components in the construction of high pressure sodium lamps. Another application of the sealing materials described includes the formation of protective metal halide coatings on cermet materials and on a range of refractory metals such as niobium, tungsten, molybdenum, tantalum for the construction of ceramic metal halide discharge lamps containing sodium vapours and/or metal halide vapours.

The sealing materials of this invention can be used to join sintered alumina or artificial single crystal sapphire components, cermet components or alumina to cermet components of any convenient geometry for the construction of ceramic discharge lamps. Such lamps may show improved performance as regards efficiency, colour rendition and higher resistance to metal halide attack at elevated temperature than conventional metal halide lamps using silica envelopes.

We claim:

1. A sealing composition for use in electrical discharge devices consisting of by weight from 55 to 95% of a rare earth oxide, from 5 to 45% of boric oxide, an amount of up to 5% of phosphorous pentoxide and an amount of up to 5% of an oxide selected from aluminum oxide and magnesium oxide.

2. A sealing composition according to claim 1 wherein the rare earth oxide comprises lanthanum oxide.

3. A sealing composition according to claim 1 consisting of weight from 60 to 95% of lanthanum oxide, from 5 to 40% of boric oxide and from 0 to 5% of the oxide of a rare earth than lanthanum.

4. A sealing composition according to claim 1 which comprises both aluminum oxide and magnesium oxide.

5. A sealing composition according to claim 4 wherein the total amount of phosphorous pentoxide, aluminum oxide and magnesium is up to 5% by weight.

6. A sealing composition according to claim 1 wherein the rare earth oxide and boric oxide are present in substantially eutectic proportions.

7. A sealing composition comprising by weight about 88.5% lanthanum oxide, 10.5% boric oxide, 0.5% aluminum oxide, 0.5% magnesium oxide and 0.5% phosphorus pentoxide.

* * * * *